US005458934A

United States Patent [19]

Rzasa

[11] Patent Number: 5,458,934
[45] Date of Patent: Oct. 17, 1995

[54] SELF CLEANING ROLL STOCK LEADER

[76] Inventor: Richard B. Rzasa, 105 Tunxis St., Poquonock, Conn. 06064

[21] Appl. No.: 246,323

[22] Filed: May 19, 1994

[51] Int. Cl.$^{6}$ ...... B32B 1/06

[52] U.S. Cl. ...... 428/35.2; 428/43; 428/76; 428/906; 242/1; 15/DIG. 12

[58] Field of Search ...... 428/906, 76, 35.2, 428/43; 242/1; 15/DIG. 12, DIG. 13; 360/137

[56] References Cited

U.S. PATENT DOCUMENTS 3,823,947 7/1974 Sasaki et al. ...... 15/DIG. 12
3,827,699 8/1974 Waugh ...... 15/DIG. 12
5,227,226 7/1993 Rzasa ...... 428/219

*Primary Examiner*—Alexander S. Thomas
*Attorney, Agent, or Firm*—Chilton, Alix & Van Kirk

[57] ABSTRACT

The present invention incorporates a cleaning strip, preferably at the leading terminus or trailing terminus of roll stock, whereby the contaminated components are cleaned either immediately before or immediately after the roll stock is utilized, but without human intervention. Preferably, the cleaning strip has an automated solvent dispensing portion, and a technical cleaning card follower portion, whereby the feed rollers of the equipment automatically distribute solvent from a pouch, onto the cleaning card, such that, as the cleaning strip passes through the contaminated components, the components are initially dampened with solvent, scrubbed, and dried, all within the period of time defined by the passage of the cleaning strip through the contaminated components.

16 Claims, 2 Drawing Sheets

SELF CLEANING ROLL STOCK LEADER

BACKGROUND OF THE INVENTION

The present invention relates to the field of technical cleaning, and more particularly, to the cleaning of feed rollers, print heads, reader heads, and similar roll stock processing components through which roll stock is transported continually.

In numerous situations observable in common day life, a roll of stock, such as ribbon, label, ticket, or paper stock, is transported via feed rollers and processed (e.g., printed or read) before dispensing to an end user. Examples include the printing, reading, and validation of automated ticket and boarding passes, printing of baggage tag tracking labels, air cargo tracking and ground tracking labels, at airports and other such terminals, lottery tickets, theater tickets, and all other bar code and non bar code label stock and the like. Blank tickets or labels are fan folded or carried on a large roll which is mounted on the inside or the outside of the dispensing equipment. Periodically the roll is used up and must be replaced. During the course of use, the feed rollers and other associated components such as print heads or read heads, accumulate contaminants, some of which have rubbed off from the roll stock, and others of which have been deposited from the ambient conditions outside and within the equipment.

Accordingly, the rollers, print heads, read heads, and the like (hereinafter collectively referred to as the contaminated components), require cleaning. Conventionally, such cleaning requires the equipment operator or maintenance personnel, to disassemble and clean the contaminated components manually, or to run a specially adapted cleaning card through the contaminated components. Preferably a solvent, such as isopropyl alcohol or the like, is deposited on the cleaning card prior to insertion and transport through the contaminated components. A new roll stock is mounted, but resumed operation cannot begin until the solvent has fully evaporated from the cleaned components.

Three disadvantages are evident from the conventional cleaning scenario as described above. First, the operator of the equipment must have a supply of cleaning material and solvent on hand, which necessarily includes the cost of tracking inventory, ordering and storing materials, as well as the record keeping as to when cleaning is appropriate. Secondly, unproductive labor costs are inevitable, because significant human activity is required not only in connection with the record keeping, but also with the acts of cleaning the contaminated components according to schedule. Finally, the cleaning itself removes the equipment from normal usage and this is prolonged unnecessarily by the time required for the cleaned components to dry when a solvent is used.

SUMMARY OF THE INVENTION

It is an object of the present invention, to eliminate the need for maintaining individual cleaning materials on hand for the cleaning of contaminated components associated with the use of roll stock, and to eliminate specific cleaning activities by the operator of the equipment.

This object is achieved by incorporating the cleaning material as part of the roll stock, so that cleaning is achieved automatically, whenever the operator replaces the roll stock.

In particular, the present invention incorporates a cleaning strip, preferably at the leading terminus or trailing terminus of roll stock, whereby the contaminated components are cleaned either immediately before or immediately after the roll stock is utilized, but without human intervention.

Preferably, the cleaning strip has an automated solvent dispensing portion, and a technical cleaning card follower portion, whereby the feed rollers of the equipment automatically distribute solvent from a pouch, onto the cleaning card, such that, as the cleaning strip passes through the contaminated components, the components are initially dampened with solvent, scrubbed, and dried, all within the period of time defined by the passage of the cleaning strip through the contaminated components.

Thus, according to the broad method aspect of the present invention, the operator selects a roll stock which includes a cleaning strip at, e.g., the leading terminus or trailing terminus of the roll. The operator inserts the leading terminus of the roll stock into the feed rollers, which advance the roll stock through the contaminated components and, automatically during such advancement, the cleaning strip passes through the contaminated components without further action or attention by the operator.

In the preferred embodiment, having the automatic solvent dispensing feature, a pouch or chamber containing the solvent is located at the front of the cleaning strip so that the feed rollers squeeze the pouch, break a seal, and thereby distributing the solvent onto the cleaning card portion of the cleaning strip. Preferably, the quantity of solvent and the other detailed design considerations, result in solvent being deposited approximately along one quarter to one half of the length of the cleaning card. The remaining, dry length of the cleaning card removes excess solution and contamination, while drying the feed rollers, read heads, or print heads, so that they are immediately ready for continued operation.

As a way of avoiding the inadvertent leakage of solvent from the pouch prior to the feeding of the cleaning strip into the rollers, the pouch may have multiple chambers. The chamber at the leading end of the strip contains the solvent within a border defining a relatively high pressure burstable seal leading to a dispensing chamber, which has a relatively low pressure burstable seal. The seals burst in turn as the cleaning strip passes through the feed rollers.

Persons familiar with this field of endeavor would readily appreciate the numerous advantages associated with the present invention. The cleaning strip is preferably attached to the roll stock by the roll stock converters, so that the operator of the equipment merely purchases the enhanced roll stock in the normal manner. Moreover, the operator requires no record keeping or scheduling to assure continual cleaning of the equipment. The operator handles the enhanced roll stock in the same manner as the conventional roll stock.

Alternatively, the operator can purchase the cleaning strip as a stand-alone item and periodically pass a cleaning strip through the contaminated components, between changes of the roll stock. In this stand-alone embodiment of the invention, the cleaning strip may include a leader in advance of the solvent pouch, to assure a firm engagement by the feed rollers.

BRIEF DESCRIPTION OF THE DRAWINGS

These and other objects and advantages of the invention will be more evident from the following description of the preferred embodiments, and accompanying drawings, in which.

DESCRIPTION OF THE PREFERRED EMBODIMENT

Figure 1:
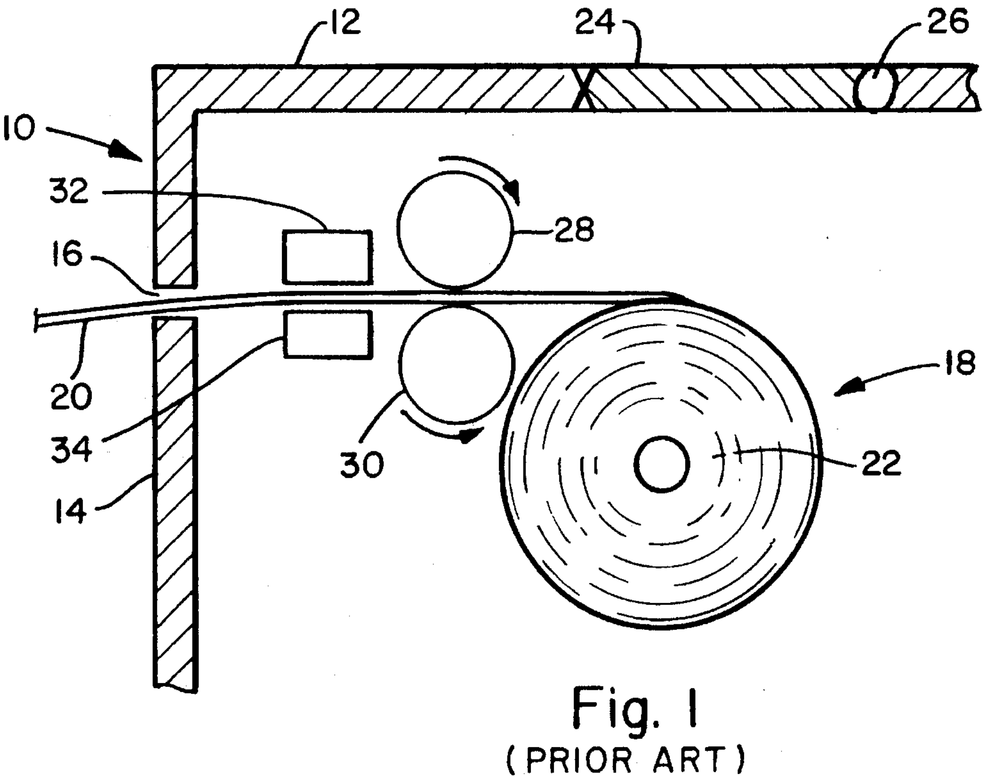
Fig. 1 (PRIOR ART)
FIG. 1 is a schematic, section view of roll stock dispensing equipment such as a ticket or label dispenser including print head, as is known in the prior art.

FIG. 1 shows a schematic of equipment 10 having a housing including an upper panel 12 and front panel 14 including a slot 16 through which portions of roll stock 18 are dispensed to an operator or other end user. In FIG. 1, it can be assumed that a new roll 18 has been mounted in the equipment 10 such that the leading terminus 20 of the new roll has been advanced through slot 16, while the trailing terminus 22 is at the center of the wound roll 18, within the equipment 10. The roll 18 is periodically replaced after the trailing terminus 22 has been dispensed through slot 16. This replacement is accomplished in a known manner, for example, by pivoting a hatch or door 24 about a hinge 26 in top panel 12, so that the operator has access to the mounting point (not shown) for roll 18. As is known, feed rollers 28,30 are positioned such that the operator, after mounting a new roll 18, can insert the leading terminus 20 between the rollers 28,30, and advance the leading terminus into position relative to read or print heads 32,34.

Figure 2:
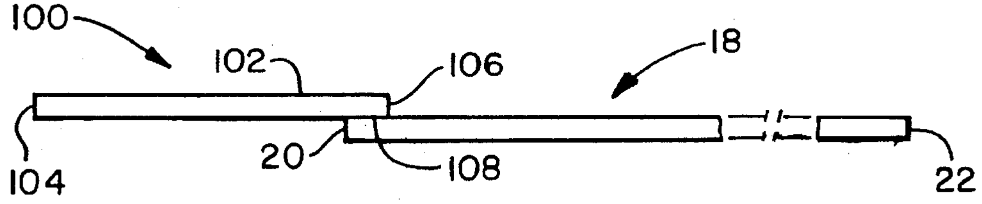
FIG. 2 is a schematic representation of a first embodiment of the invention, showing a cleaning strip attached to the leading terminus of conventional roll stock.
Figure 3:
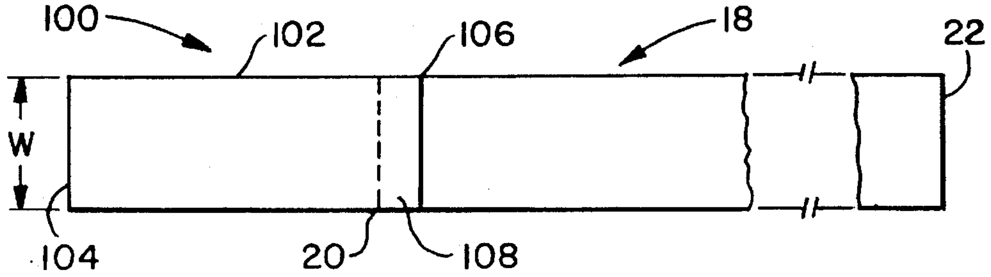
FIG. 3 is a plan view of the embodiment shown in FIG. 2.
Figure 4:
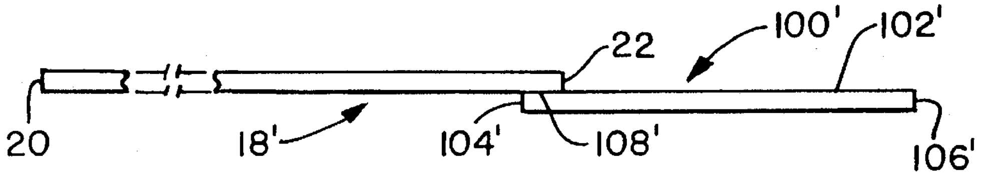
FIG. 4 is a variation of the embodiment shown in FIG. 2, wherein the cleaning strip is attached to the trailing terminus of the roll stock.

In accordance with a first embodiment of the invention 100, 100' as shown in FIGS. 2–4, a cleaning strip 102, 102' is attached to either the leading terminus 20, or the trailing terminus 22, of the roll 18, 18', to form an enhanced roll 100, 100'. In the version of FIGS. 2 and 3, to the cleaning strip 102 has a front end 104 and a back end 106, the latter being joined as by bonding or heat sealing at 108 to the terminus 20 of the roll stock 18. In the version of FIG. 4, front end 104' of cleaning strip 102' overlaps the trailing terminus 22 of roll 18', and is joined thereto at 108'. As shown in FIG. 3, the width W of the cleaning strip 102 (and 102') is substantially the same as or slightly smaller than the width of the conventional roll stock 18.

It can be easily understood that in the version of FIG. 2, the front end 104 initially passes through feed rollers 28,30, then along the print-read head 32,34, dry cleaning these contaminated components before the labels, tickets, or the like from the ribbon or label roll 18 are dispensed. In the version of FIG. 4, the contaminated components are cleaned by strip 102' after the roll stock, has been dispensed.

Persons ordinarily skilled in this field, would readily select the size and composition of the cleaning strip 102, 102', that is most suitable for use in any particular type of equipment 10. Without limitation, such cleaning strip can be constructed of woven or non-woven materials, spun bonded polyester, paper, or lamination including woven or non-woven felts and the like carried by a central semi-rigid material such as plastic or paper. Thickness and opacity of the cleaning strip may also be optimized depending on the gap between transport rollers 28,30 or print/reader heads 32,34 and associated supports. The material of the cleaning strip would, in the embodiments of FIGS. 2 and 4, normally be a substantially uniform card throughout the length of the strip 102, 102'. In one sense, the embodiment of FIGS. 2–4 may be viewed as the attachment of a technical cleaning card to the leading or trailing terminus of roll stock material. Such attachment at 108, 108', can be via known adhesives, heat sealed or other readily ascertainable techniques.

It should be appreciated that the embodiment of FIGS. 2–4 represent a significant improvement relative to the conventional cleaning of contaminated components for equipment of the type shown in FIG. 1. Preferably, however, the operator would, if not with every change of the roll stock 18, then at least on a regular basis, such as every third roll replacement, manually dispense cleaning solvent at the front end 104 of the version shown in FIG. 2. This becomes more of a nuisance with the version shown in FIG. 4, because the operator must then know in advance when the roll is almost fully unwound.

Figure 5:
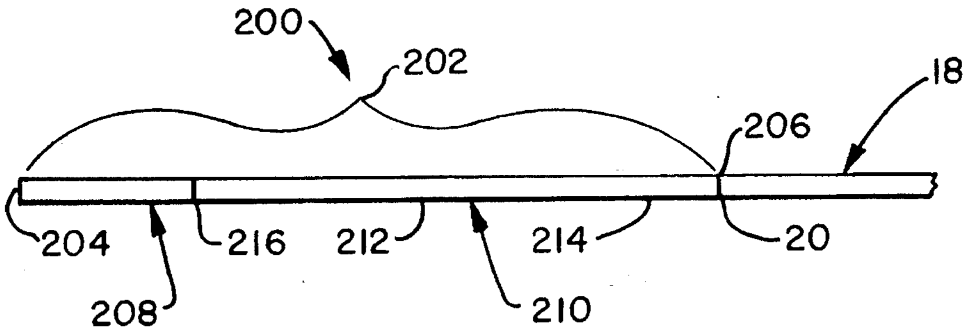
FIG. 5 is a schematic representation of a second embodiment of the invention, wherein the cleaning strip includes an automatic solvent dispensing packet.

The embodiment shown in FIG. 5 minimizes operator involvement in the cleaning of the contaminated components, while maximizing the cleanliness of these components. In this embodiment 200, the cleaning strip 202 includes two portions, an automatic solvent dispensing portion 208, and a cleaning card portion 210. Viewed on a gross scale, the embodiment 200 includes a thin automatic solvent dispensing pouch or unit at the front end 204, followed by a cleaning card 210 in strip form connected at 216 to the dispensing unit 208, followed by the roll stock 18 having its leading terminus 20 joined to the back end 206 of the cleaning strip 202. In use, the solvent dispensing portion 208 enters the space between the feed rollers 28,30 as shown in FIG. 1, whereupon the solvent is dispersed onto the front portion 212 of the cleaning card 210. As the wetted portion 212 passes through the rollers and/or other contaminated components, the solvent, as well as the texture of the cleaning card, remove contaminants. The remaining portion 214 of cleaning card 210, has not been directly wetted by solvent, and therefore not only picks up residual contaminants, but also removes excess solvent as it passes through the components.

When the cleaning strip 202 is dispensed through slit 16 to the exterior of equipment 10 (shown in FIG. 1), it can readily be cut off and properly disposed of before normal use of the equipment 10 is resumed.

Figure 6:
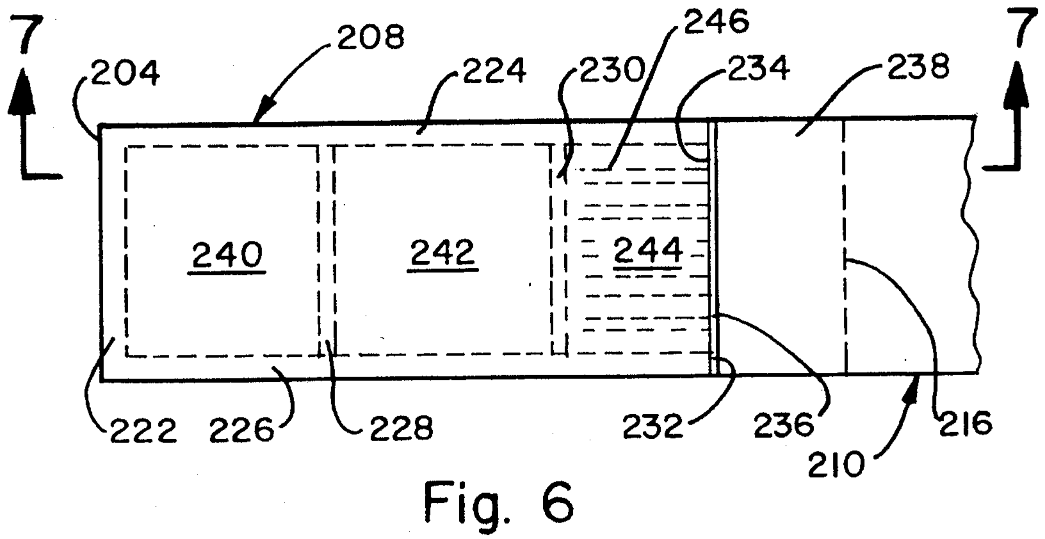
FIG. 6 is a detailed plan view of the automatic dispensing packet of the embodiment shown in FIG. 5.
Figure 7:
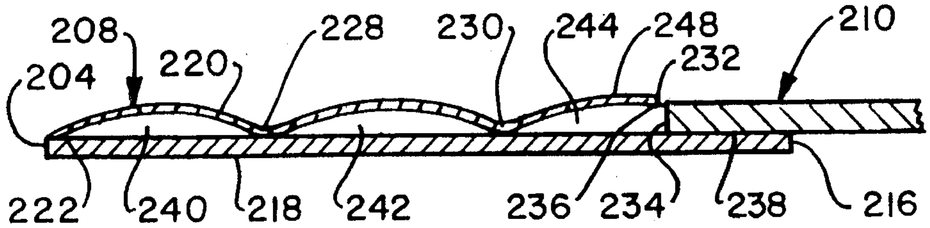
FIG. 7 is a section view, taken along line 7—7 of FIG. 6.

FIGS. 6 and 7 show the details of a comprehensive embodiment for implementing the overall functionality described with respect to FIG. 5. The dispensing unit 208 is in the form of a multi-chamber packet having a base or lower member 218 and a top or upper member 220, which are sealed to each other in the following manner. A series of structural seals 222,224, and 226 strongly bond the upper and lower members 220,218 along the front 204 and side edges. These seals remain intact at all times. A first transverse seal 228 and a second transverse seal 230, define closed chambers 240 and 242, respectively. The seal or barrier 228 has a relatively high burst threshold as compared with that of seal or barrier 230, e.g., twice as high. The burst pressures of barriers 228,230 are both, however, significantly lower than that of the structural seals 220,224, and 226. The back edge 232 of upper member 220 need not be sealed either to the lower member 218 or to the cleaning card 210. The cleaning card 210 is, however, joined at 238 at the back portion 216 of the lower member 218. The front edge 234 of the cleaning card 210 need not overlap with back edge 232, but may define a gap 236 therebetween.

In use, the front end 204 of cleaning strip 202 is introduced between the feed rollers 28,30 (FIG. 1), whereby the chamber 240 is "squeezed". The chamber 240 contains solvent, such as isopropyl alcohol, and the pressure thereon due to the action of the rollers eventually overcomes the barrier at 228, so that the solvent is delivered into chamber 242. The chamber 240 may be viewed as a solvent storage chamber, whereas chamber 242 may be viewed as a dispensing chamber or manifold. As the strip 202 advances through the rollers, the second barrier 230 is breached and the solvent enters volume 244 under flap 248. This may be viewed as a distribution volume, from which the solvent spreads evenly and permeates the front portion 212 of the cleaning card 210 (see FIG. 5), as the solvent flows through gap 236. It should be understood that the distribution of solvent onto the card 210 does not rely entirely on controlling the flow characteristics of gap 236. Rather, the rollers 28,30 which have a width at least that of the strip (i.e., at least width W as shown in FIG. 3), also help distribute the solvent across the full width of the card 210.

The pouch or packet 208 can be constructed of low or high density polyethylene or peelable film. The burst seals 228,230 are preferably formed by the application of heat and pressure in a known manner, controlled to obtain optimum releasing or bursting during the forward motion of the packet between the rollers.

As a practical matter, a cleaning strip such as 102 (FIGS. 2–4), or 202 (FIGS. 5–7), would be at least about one half inch in width and about one inch in length, but a width to about 20 inches and a length to about 6 feet, would find practical use. It is contemplated that most cleaning strips would be on the order of one to six inches in width, and up to three feet in length, with the solvent dispensing portion 208 constituting less than one half the total length of the strip 202 in the embodiment shown in FIG. 5.

It should be understood that variations other than the embodiments shown in the accompanying figures, may still fall within the scope of the claims of the present specification. For example, the cleaning strip 202 shown in FIG. 5 can be passed through the contaminated components shown in FIG. 1, without being attached to the roll 18. In another embodiment, the seal 230 and chamber 242 can be eliminated such that the solvent passes directly from chamber 240 into contact with the cleaning card 210 via gap 236, without interruption by a secondary barrier 230. As noted above, secondary barrier 230 and chamber 242 can be provided as a backup in the event of a leak from the storage chamber 240, but this feature is not necessary for practicing the invention. Solvent distribution channels or the like immediately in front of gap 236 such as represented at 246, may be desirable under some circumstances, e.g., with very wide strips 208.

I claim:

1. A cleaning pack for automatically cleaning feed rollers and related roll stock processing components comprising:

an elongated strip including technical cleaning card material sized to pass through feed rollers, the strip having a width and front and back ends;

a pouch carried at the front end of the strip, the pouch including chamber means having a breachable barrier for confining a cleaning solvent, and means for distributing fluid between the barrier and the card material;

whereby breaching of the barrier as the strip passes through the feed rollers causes solvent to flow from the chamber means through the distribution means onto the card material between the pouch and the back end of the strip.

2. The cleaning pack of claim 1, wherein the distribution means includes a flap having a free edge at the front end of the cleaning card.

3. The cleaning pack of claim 1 wherein the distribution means includes manifold means for receiving the solvent from the chamber means when the barrier is breached and spreading the solvent substantially evenly across the width of the pouch before the solvent flows onto the card material.

4. The cleaning pack of claim 1, wherein the distribution means includes a plurality of parallel channels extending longitudinally in the pouch to deposit solvent substantially evenly along the width of the card material.

5. The cleaning pack of claim 4, wherein the distribution means includes manifold means for receiving the solvent from the chamber means when the barrier is breached and spreading the solvent substantially evenly across the width of the pouch before the solvent enters the parallel channels.

6. The cleaning pack of claim 5, wherein the barrier is a heat seal across the width of the pouch separating the chamber means from the manifold means.

7. The cleaning pack of claim 1, wherein the chamber means includes a storage chamber confining cleaning solvent and a first breachable barrier shared with an empty, dispensing chamber.

8. The cleaning pack of claim 7, wherein said dispensing chamber has a second breakable wall and said distribution means includes a flap following said second barrier.

9. The cleaning pack of claim 8, wherein the pressure required to break said second barrier is less than the pressure required to break said first barrier.

10. Enhanced roll stock having a width, a leading terminus for insertion into feed rollers which continually engage and advance the stock material through a processor, and a trailing terminus, wherein the improvement comprises:

an elongated end strip attached to one of the leading terminus or trailing terminus of the roll stock such that the strip and stock are engageable for advancement by the feed rollers, said strip comprising technical cleaning card material and having front and back ends;

a pouch carried at the front end of the strip, the pouch including chamber means having a breachable barrier and containing a cleaning solvent;

whereby breaching of the barrier as the strip is engaged and advanced through the rollers causes solvent to flow from the chamber means onto the card material between the pouch and the back end of the strip.

11. The roll stock of claim 10, wherein the breachable barrier of the chamber means containing solvent, is shared with a second, empty dispersing chamber having another breachable barrier adjacent the front end of the technical cleaning card.

12. In a roll of ribbon, label, ticket or paper stock material, the improvement comprising an elongated strip of technical cleaning card material having front and back portions attached at one of the trailing or leading ends of the roll stock material, respectively, and a sealed chamber containing cleaning solvent, said chamber located at the front portion of the strip and having a barrier breachable to release solvent onto the cleaning card material as the chamber passes through feed rollers.

13. The roll stock of claim 12, wherein the chamber and barrier are defined by an upper film member partially sealed to a lower film member, and the strip is joined to one of said members adjacent said barrier.

14. A method of automatically cleaning feed rollers as the rollers engage and advance newly installed roll stock, comprising:

selecting an enhanced roll stock which includes a cleaning strip having technical cleaning card material and a pouch containing cleaning solvent;

inserting the strip into the feed rollers so that the enhanced roll stock is engaged and advanced by the rollers;

whereby as the rollers advance the enhanced roll stock, the rollers encounter the cleaning strip, break the pouch, releasing the solvent onto the cleaning card material, which cleans the rollers as the rollers continue to advance the cleaning strip.

15. The method of claim 14, wherein the step of breaking the pouch and releasing the solvent onto the cleaning card material, includes the steps of breaking a first chamber containing solvent so that the solvent flows into a second chamber, followed by the step of breaking the second chamber so that the solvent is released onto the cleaning card material.

16. The method of claim 14, wherein the step of releasing, wets less than one half the length of the cleaning card with solvent during the time that the cleaning card is in contact with the feed rollers.

* * * * *